US012639062B2

(12) United States Patent
Nguyen

(10) Patent No.: US 12,639,062 B2
(45) Date of Patent: May 26, 2026

(54) RESOLVING AN ISSUE ASSOCIATED WITH A WIRELESS TELECOMMUNICATION NETWORK BY SUGGESTING A SOLUTION TO THE ISSUE AND RECEIVING AN APPROVAL FROM AN AUGMENTED REALITY/VIRTUAL REALITY AR/VR DEVICE ASSOCIATED WITH AN OPERATOR OF THE NETWORK

(71) Applicant: T-Mobile USA, Inc., Bellevue, WA (US)

(72) Inventor: Phi Hoang Nguyen, Lacey, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 265 days.

(21) Appl. No.: 18/597,696

(22) Filed: Mar. 6, 2024

(65) Prior Publication Data

US 2025/0284478 A1    Sep. 11, 2025

(51) Int. Cl.
*G06F 8/65* (2018.01)
*H04L 67/00* (2022.01)
*H04W 24/10* (2009.01)

(52) U.S. Cl.
CPC ................ *G06F 8/65* (2013.01); *H04L 67/34* (2013.01); *H04W 24/10* (2013.01)

(58) Field of Classification Search
CPC ........... H04W 24/10; H04L 67/34; G06F 8/65
See application file for complete search history.

(56) References Cited

U.S. PATENT DOCUMENTS

| | | | |
|---|---|---|---|
| 9,538,366 | B2 | 1/2017 | Soini |
| 9,565,085 | B2 | 2/2017 | Balachandran et al. |
| 10,019,302 | B2 | 7/2018 | Nguyen et al. |
| 10,148,819 | B2 | 12/2018 | Yokel et al. |
| 10,425,320 | B2 | 9/2019 | Nistor et al. |
| 10,735,590 | B2 | 8/2020 | Prakash et al. |
| 11,150,788 | B2 | 10/2021 | Timonen et al. |
| 11,178,028 | B1 | 11/2021 | Maseedu |
| 11,294,482 | B2 | 4/2022 | Timonen et al. |

(Continued)

FOREIGN PATENT DOCUMENTS

| | | |
|---|---|---|
| CN | 101151915 B | 3/2013 |
| CN | 104854893 A | 8/2015 |

(Continued)

*Primary Examiner* — Phillip H Nguyen
(74) *Attorney, Agent, or Firm* — Perkins Coie LLP

(57)    ABSTRACT

The system obtains an issue associated with a network and resolves the issue by suggesting a solution and receiving an approval from an AR/VR device. Based on the issue, the system creates a ticket describing the issue and obtains diagnostic information associated with the issue. Based on the diagnostic information, the system determines a fix for the issue and sends a first notification to the AR/VR device. The first notification includes a description of the issue, the fix for the issue, and a request to test the fix. Upon receiving an approval to test the fix, the system performs regression testing using the fix and determines whether the fix passed the regression testing. Upon determining that the fix passed the regression testing, the system sends a second notification to the AR/VR device requesting an approval to deploy the fix, and upon receiving the approval, the system deploys the fix.

20 Claims, 13 Drawing Sheets

(56) References Cited

U.S. PATENT DOCUMENTS

| | | | |
|---|---|---|---|
| 11,297,513 B2 | 4/2022 | Agarwal et al. | |
| 11,363,144 B2 | 6/2022 | Lau et al. | |
| 11,451,973 B2 | 9/2022 | Emani et al. | |
| 11,489,742 B2 | 11/2022 | Maseedu | |
| 11,490,432 B1 | 11/2022 | Menon et al. | |
| 11,526,388 B2 | 12/2022 | Prakash et al. | |
| 11,595,288 B2 | 2/2023 | Nguyen et al. | |
| 11,617,093 B1 | 3/2023 | Artuso | |
| 11,627,217 B2 | 4/2023 | Bodiga et al. | |
| 11,678,201 B2 | 6/2023 | Veggalam et al. | |
| 11,695,642 B2 | 7/2023 | Bhat et al. | |
| 11,722,388 B2 | 8/2023 | Maseedu | |
| 11,743,393 B2 | 8/2023 | Zhang et al. | |
| 11,751,087 B2 | 9/2023 | Saluja et al. | |
| 11,796,333 B1 | 10/2023 | Stan et al. | |
| 11,800,398 B2 | 10/2023 | Amer | |
| 11,831,534 B2 | 11/2023 | Nguyen et al. | |
| 11,855,831 B1 | 12/2023 | Nguyen et al. | |
| 11,886,767 B2 | 1/2024 | Nguyen | |
| 2004/0060044 A1* | 3/2004 | Das | G06F 11/1433 714/48 |
| 2010/0274675 A1 | 10/2010 | Lee | |
| 2013/0246849 A1* | 9/2013 | Plamondon | G06F 11/3668 714/E11.178 |
| 2018/0131810 A1 | 5/2018 | Yokel | |
| 2020/0019493 A1* | 1/2020 | Ramakrishna | G06F 8/20 |
| 2022/0413951 A1 | 12/2022 | Prakash et al. | |
| 2023/0100468 A1* | 3/2023 | Le | G06F 11/3692 717/124 |
| 2023/0169424 A1 | 6/2023 | Gardini Vedovatto | |
| 2023/0171146 A1 | 6/2023 | Gardini Vedovatto | |
| 2023/0199515 A1 | 6/2023 | Artuso | |
| 2023/0216953 A1 | 7/2023 | Bodiga et al. | |

FOREIGN PATENT DOCUMENTS

| | | | |
|---|---|---|---|
| CN | 105074647 B | 1/2018 | |
| CN | 109964506 A | 7/2019 | |
| CN | 110249705 A | 9/2019 | |
| CN | 110291799 A | 9/2019 | |
| CN | 111034251 A | 4/2020 | |
| CN | 113424132 A | 9/2021 | |
| CN | 113454573 A | 9/2021 | |
| DE | 19740560 B4 | 2/2004 | |
| DE | 102008018958 A1 | 10/2008 | |
| DE | 102009015248 A1 | 10/2010 | |
| DE | 102012022034 A1 | 5/2014 | |
| DE | 102015109203 B4 | 7/2023 | |
| EP | 1344390 A1 | 9/2003 | |
| EP | 1407431 A2 | 4/2004 | |
| EP | 1958351 B1 | 8/2010 | |
| EP | 2428067 A1 | 3/2012 | |
| EP | 2522121 A1 | 11/2012 | |
| EP | 3535990 A1 | 9/2019 | |
| EP | 3677066 A1 | 7/2020 | |
| EP | 3762769 A1 | 1/2021 | |
| EP | 3841706 A1 | 6/2021 | |
| EP | 3642969 B1 | 10/2021 | |
| EP | 3571859 B1 | 3/2022 | |
| JP | 2000516061 A | 11/2000 | |
| JP | 2000516777 A | 12/2000 | |
| JP | 2004530958 A | 10/2004 | |
| JP | 5646466 B2 | 11/2014 | |
| JP | 2015523014 A | 8/2015 | |
| JP | 6062494 B2 | 12/2016 | |
| JP | 6374519 B2 | 7/2018 | |
| JP | 6407794 B2 | 9/2018 | |
| JP | 2020515155 A | 5/2020 | |
| KR | 20010032783 A | 4/2001 | |
| KR | 20010064678 A | 7/2001 | |
| KR | 20120020162 A | 3/2012 | |
| KR | 101134256 B1 | 4/2012 | |
| KR | 101292037 B1 | 8/2013 | |
| KR | 101498006 B1 | 3/2015 | |
| KR | 102115104 B1 | 6/2020 | |
| KR | 102548800 B1 | 6/2023 | |
| WO | 0229739 A2 | 4/2002 | |
| WO | 2016022475 A2 | 2/2016 | |
| WO | 2017214271 A1 | 12/2017 | |
| WO | 2018084897 A1 | 5/2018 | |
| WO | 2018085696 A2 | 5/2018 | |
| WO | 2018125996 A1 | 7/2018 | |
| WO | 2018132901 A1 | 7/2018 | |
| WO | 2018209295 A1 | 11/2018 | |
| WO | 2018236257 A1 | 12/2018 | |
| WO | 2019173079 A1 | 9/2019 | |
| WO | 2020185310 A1 | 9/2020 | |
| WO | 2020185311 A1 | 9/2020 | |
| WO | 2021051007 A1 | 3/2021 | |
| WO | 2021236212 A1 | 11/2021 | |
| WO | 2022260828 A1 | 12/2022 | |

* cited by examiner

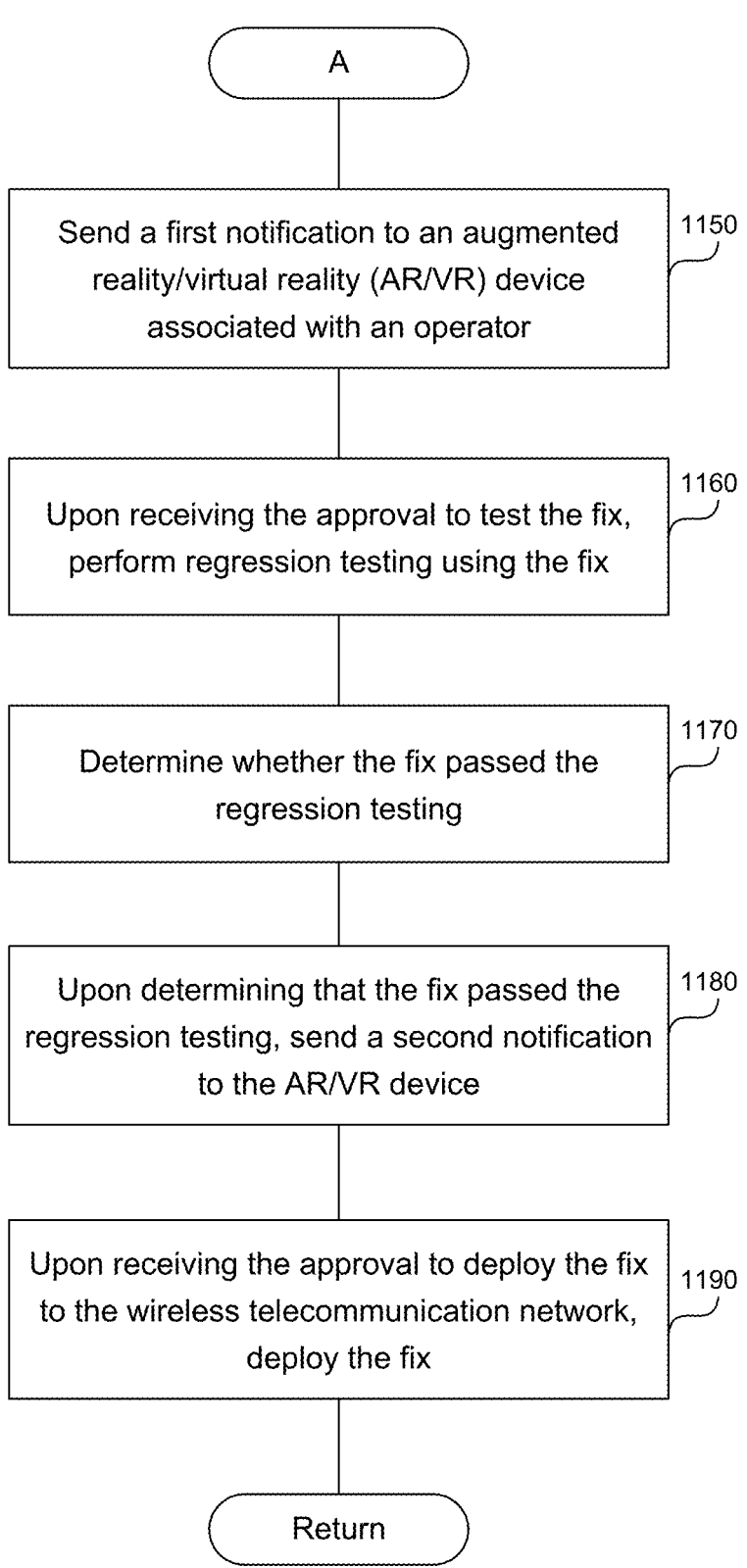

A

Send a first notification to an augmented reality/virtual reality (AR/VR) device associated with an operator    1150

Upon receiving the approval to test the fix, perform regression testing using the fix    1160

Determine whether the fix passed the regression testing    1170

Upon determining that the fix passed the regression testing, send a second notification to the AR/VR device    1180

Upon receiving the approval to deploy the fix to the wireless telecommunication network, deploy the fix    1190

Return

*FIG. 11B*

RESOLVING AN ISSUE ASSOCIATED WITH A WIRELESS TELECOMMUNICATION NETWORK BY SUGGESTING A SOLUTION TO THE ISSUE AND RECEIVING AN APPROVAL FROM AN AUGMENTED REALITY/VIRTUAL REALITY AR/VR DEVICE ASSOCIATED WITH AN OPERATOR OF THE NETWORK

BACKGROUND

In the fast-paced landscape of dynamic wireless networks, a sluggish response not only poses operational challenges but also exposes companies to significant risks, such as user attrition. In the event of ongoing application or security alerts, dedicated Subject Matter Experts (SMEs) are accessible—whether situated in the office or working remotely—equipped with identical tools and high-speed internet connections. This accessibility ensures a swift initial response to emerging issues. However, the journey towards effective 24×7 application support has been a persistent challenge for numerous wireless telecommunication network providers over an extended period.

The foremost hurdles in this pursuit are the scarcity of adequately supported operators and the timely onboarding of resources. In dynamic environments, the demand for rapid issue resolution is paramount, requiring a workforce that is not only skilled but also promptly integrated into the existing support infrastructure. The lack of such operators can exacerbate the impact of network issues and hinder the wireless telecommunication network's ability to address them promptly.

Another critical bottleneck is the time for SMEs to comprehend the root cause of issues and formulate effective resolution steps. This delay further amplifies the potential consequences of network disruptions, leaving the wireless telecommunication networks vulnerable to prolonged downtimes and the associated negative impacts on customer satisfaction and financial performance.

BRIEF DESCRIPTION OF THE DRAWINGS

Detailed descriptions of implementations of the present invention will be described and explained through the use of the accompanying drawings.

FIGS. 11A-11B show a flowchart of a method to resolve an issue associated with the network by suggesting the solution to the issue and receiving an approval from an AR/VR device associated with an operator of the network.

Figure 1:
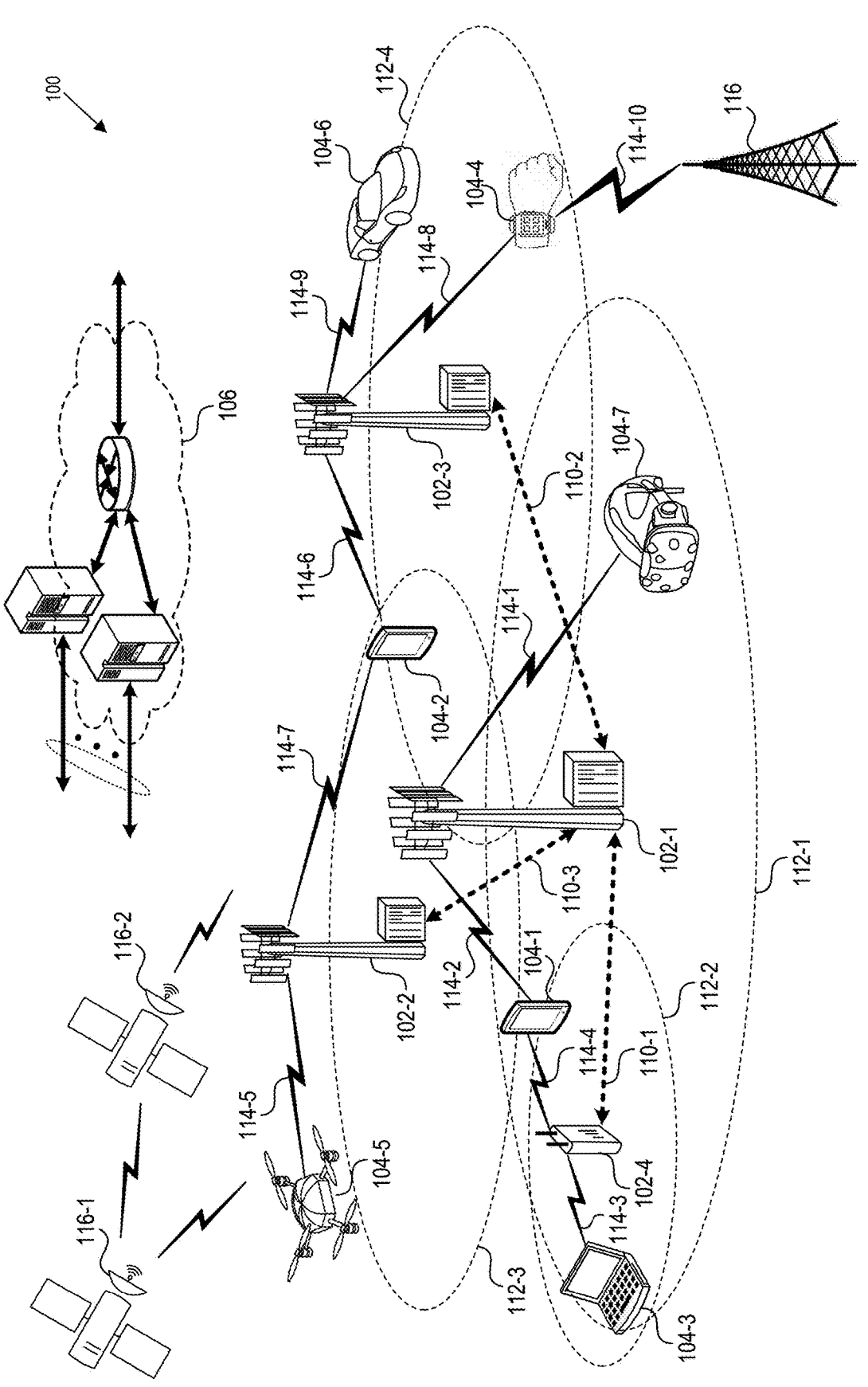
FIG. 1 is a block diagram that illustrates a wireless telecommunication network in which aspects of the disclosed technology are incorporated.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

The disclosed system integrates a large language model (LLM) and generative artificial intelligence (GenAI) into the wireless telecommunication network to enhance efficiency and accuracy of issue resolution and recognition. The disclosed system goes beyond merely automating trouble ticket creation; instead, the system leverages advanced artificial intelligence (AI) to identify potential root causes and provide recommendations for resolution, covering everything from code generation to deployment, testing certification, and capturing approval before introducing a feature live. The entire end-to-end process, from issue recognition to resolution, is now fully automated through this newly disclosed system.

The disclosed system not only allows for precise identification of issues and resolutions but also streamlines the time-consuming steps traditionally handled by application support SMEs. The primary objective is to propel wireless telecommunication network operations forward with minimal interruptions to application software. This goal is paramount for every wireless telecommunication network, irrespective of on-call operator or the technological tools available to a support operator, even when not physically present in the office, operating seamlessly with the leading-edge augmented reality (AR) toolsets over the right 5G network environment.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples. Wireless Communications System FIG. 1 is a block diagram that illustrates a wireless telecommunication network 100 ("network 100") in which aspects of the disclosed technology are incorporated. The network 100 includes base stations 102-1 through 102-4 (also referred to individually as "base station 102" or collectively as "base stations 102"). A base station is a type of network access node (NAN) that can also be referred to as a cell site, a base transceiver station, or a radio base station. The network 100 can include any combination of NANs including an access point, radio transceiver, gNodeB (gNB), NodeB, eNodeB (eNB), Home NodeB or Home eNodeB, or the like. In addition to being a wireless wide area network (WWAN) base station, a NAN can be a wireless local area network (WLAN) access point, such as an Institute of Electrical and Electronics Engineers (IEEE) 802.11 access point.

The NANs of a network 100 formed by the network 100 also include wireless devices 104-1 through 104-7 (referred to individually as "wireless device 104" or collectively as "wireless devices 104") and a core network 106. The wireless devices 104 can correspond to or include network 100 entities capable of communication using various connectivity standards. For example, a 5G communication channel can use millimeter wave (mmW) access frequencies of 28 GHz or more. In some implementations, the wireless device 104 can operatively couple to a base station 102 over a long-term evolution/long-term evolution-advanced (LTE/LTE-A) communication channel, which is referred to as a 4G communication channel.

The core network 106 provides, manages, and controls security services, user authentication, access authorization, tracking, internet protocol (IP) connectivity, and other access, routing, or mobility functions. The base stations 102 interface with the core network 106 through a first set of backhaul links (e.g., S1 interfaces) and can perform radio configuration and scheduling for communication with the wireless devices 104 or can operate under the control of a base station controller (not shown). In some examples, the base stations 102 can communicate with each other, either directly or indirectly (e.g., through the core network 106), over a second set of backhaul links 110-1 through 110-3 (e.g., X1 interfaces), which can be wired or wireless communication links.

The base stations 102 can wirelessly communicate with the wireless devices 104 via one or more base station antennas. The cell sites can provide communication coverage for geographic coverage areas 112-1 through 112-4 (also referred to individually as "coverage area 112" or collectively as "coverage areas 112"). The coverage area 112 for a base station 102 can be divided into sectors making up only a portion of the coverage area (not shown). The network 100 can include base stations of different types (e.g., macro and/or small cell base stations). In some implementations, there can be overlapping coverage areas 112 for different service environments (e.g., Internet of Things (IoT), mobile broadband (MBB), vehicle-to-everything (V2X), machine-to-machine (M2M), machine-to-everything (M2X), ultra-reliable low-latency communication (URLLC), machine-type communication (MTC), etc.).

The network 100 can include a 5G network 100 and/or an LTE/LTE-A or other network. In an LTE/LTE-A network, the term "eNBs" is used to describe the base stations 102, and in 5G new radio (NR) networks, the term "gNBs" is used to describe the base stations 102 that can include mmW communications. The network 100 can thus form a heterogeneous network 100 in which different types of base stations provide coverage for various geographic regions. For example, each base station 102 can provide communication coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geographic area (e.g., several kilometers in radius) and can allow access by wireless devices that have service subscriptions with a wireless network 100 service provider. As indicated earlier, a small cell is a lower-powered base station, as compared to a macro cell, and can operate in the same or different (e.g., licensed, unlicensed) frequency bands as macro cells. Examples of small cells include pico cells, femto cells, and micro cells. In general, a pico cell can cover a relatively smaller geographic area and can allow unrestricted access by wireless devices that have service subscriptions with the network 100 provider. A femto cell covers a relatively smaller geographic area (e.g., a home) and can provide restricted access by wireless devices having an association with the femto unit (e.g., wireless devices in a closed subscriber group (CSG), wireless devices for users in the home). A base station can support one or multiple (e.g., two, three, four, and the like) cells (e.g., component carriers). All fixed transceivers noted herein that can provide access to the network 100 are NANs, including small cells.

The communication networks that accommodate various disclosed examples can be packet-based networks that operate according to a layered protocol stack. In the user plane, communications at the bearer or Packet Data Convergence Protocol (PDCP) layer can be IP based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid ARQ (HARQ) to provide retransmission at the MAC layer, to improve link efficiency. In the control plane, the Radio Resource Control (RRC) protocol layer provides establishment, configuration, and maintenance of an RRC connection between a wireless device 104 and the base stations 102 or core network 106 supporting radio bearers for the user plane data. At the Physical (PHY) layer, the transport channels are mapped to physical channels.

Wireless devices can be integrated with or embedded in other devices. As illustrated, the wireless devices 104 are distributed throughout the network 100, where each wireless device 104 can be stationary or mobile. For example, wireless devices can include handheld mobile devices 104-1 and 104-2 (e.g., smartphones, portable hotspots, tablets, etc.); laptops 104-3; wearables 104-4; drones 104-5; vehicles with wireless connectivity 104-6; head-mounted displays with wireless augmented reality/virtual reality (AR/VR) connectivity 104-7; portable gaming consoles; wireless routers, gateways, modems, and other fixed-wireless access devices; wirelessly connected sensors that provide data to a remote server over a network; IoT devices such as wirelessly connected smart home appliances; etc.

A wireless device (e.g., wireless devices 104) can be referred to as a user equipment (UE), a customer premises equipment (CPE), a mobile station, a subscriber station, a mobile unit, a subscriber unit, a wireless unit, a remote unit, a handheld mobile device, a remote device, a mobile subscriber station, a terminal equipment, an access terminal, a mobile terminal, a wireless terminal, a remote terminal, a handset, a mobile client, a client, or the like.

A wireless device can communicate with various types of base stations and network 100 equipment at the edge of a network 100 including macro eNBs/gNBs, small cell eNBs/gNBs, relay base stations, and the like. A wireless device can also communicate with other wireless devices either within or outside the same coverage area of a base station via device-to-device (D2D) communications.

The communication links 114-1 through 114-9 (also referred to individually as "communication link 114" or collectively as "communication links 114") shown in network 100 include uplink (UL) transmissions from a wireless device 104 to a base station 102 and/or downlink (DL) transmissions from a base station 102 to a wireless device 104. The downlink transmissions can also be called forward link transmissions while the uplink transmissions can also be called reverse link transmissions. Each communication link 114 includes one or more carriers, where each carrier can be a signal composed of multiple sub-carriers (e.g., waveform signals of different frequencies) modulated according to the various radio technologies. Each modulated signal can be sent on a different sub-carrier and carry control information (e.g., reference signals, control channels), overhead information, user data, etc. The communication links 114 can transmit bidirectional communications using frequency division duplex (FDD) (e.g., using paired spectrum resources) or time division duplex (TDD) operation (e.g., using unpaired spectrum resources). In some implementations, the communication links 114 include LTE and/or mmW communication links.

In some implementations of the network 100, the base stations 102 and/or the wireless devices 104 include multiple antennas for employing antenna diversity schemes to improve communication quality and reliability between base stations 102 and wireless devices 104. Additionally or alternatively, the base stations 102 and/or the wireless devices 104 can employ multiple-input, multiple-output (MIMO) techniques that can take advantage of multipath environments to transmit multiple spatial layers carrying the same or different coded data.

In some examples, the network 100 implements 6G technologies including increased densification or diversification of network nodes. The network 100 can enable terrestrial and non-terrestrial transmissions. In this context, a Non-Terrestrial Network (NTN) is enabled by one or more satellites, such as satellites 116-1 and 116-2, to deliver services anywhere and anytime and provide coverage in areas that are unreachable by any conventional Terrestrial Network (TN). A 6G implementation of the network 100 can support terahertz (THz) communications. This can support wireless applications that demand ultrahigh quality of service (QoS) requirements and multi-terabits-per-second data transmission in the era of 6G and beyond, such as terabit-per-second backhaul systems, ultra-high-definition content streaming among mobile devices, AR/VR, and wireless high-bandwidth secure communications. In another example of 6G, the network 100 can implement a converged Radio Access Network (RAN) and Core architecture to achieve Control and User Plane Separation (CUPS) and achieve extremely low user plane latency. In yet another example of 6G, the network 100 can implement a converged Wi-Fi and Core architecture to increase and improve indoor coverage.

5G Core Network Functions

Figure 2:
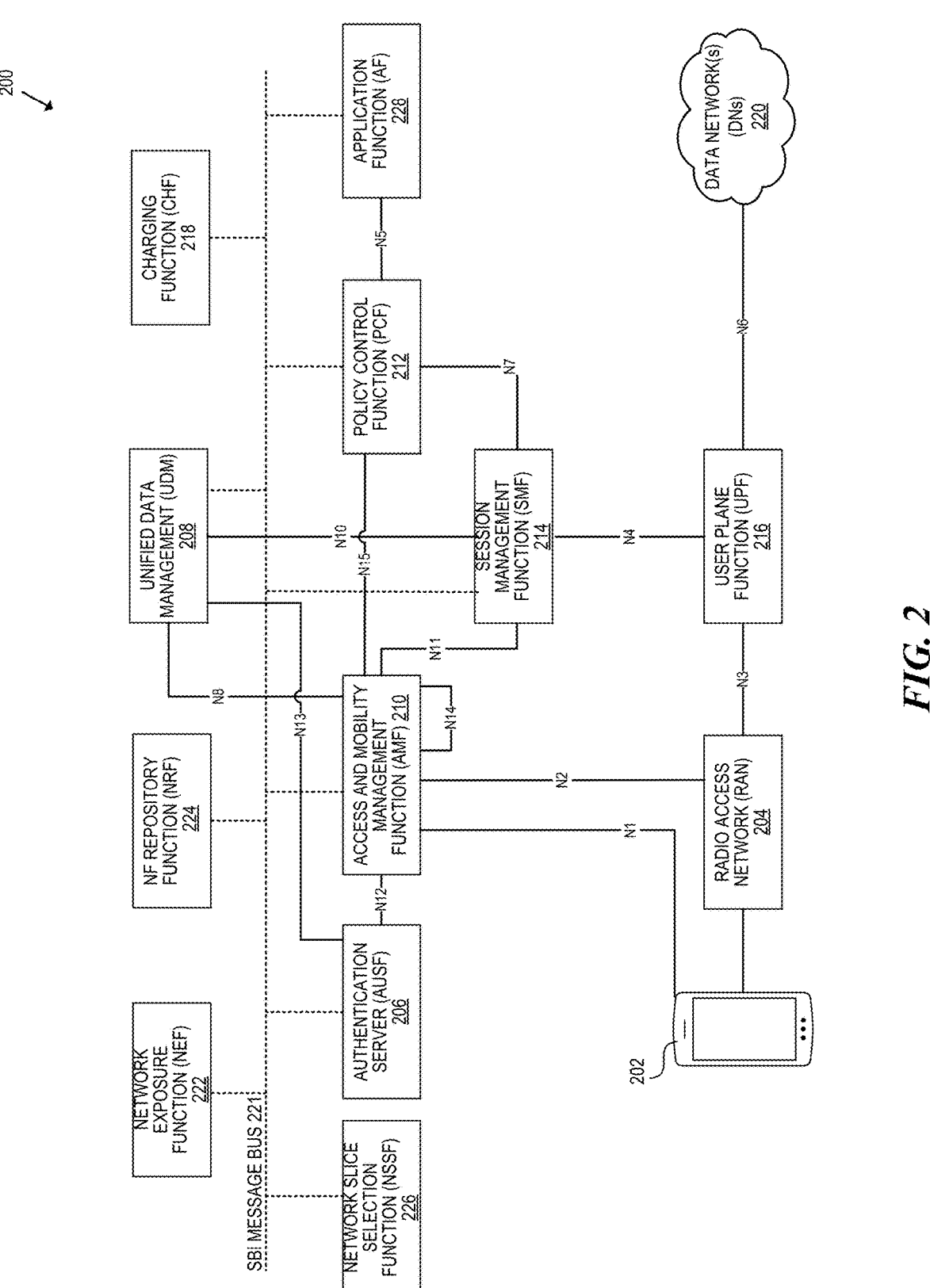
FIG. 2 is a block diagram that illustrates an architecture including 5G core network functions (NFs) that can implement aspects of the present technology.

FIG. 2 is a block diagram that illustrates an architecture 200 including 5G core network functions (NFs) that can implement aspects of the present technology. A wireless device 202 can access the 5G network through a NAN (e.g., gNB) of a RAN 204. The NFs include an Authentication Server Function (AUSF) 206, a Unified Data Management (UDM) 208, an Access and Mobility management Function (AMF) 210, a Policy Control Function (PCF) 212, a Session Management Function (SMF) 214, a User Plane Function (UPF) 216, and a Charging Function (CHF) 218.

The interfaces N1 through N15 define communications and/or protocols between each NF as described in relevant standards. The UPF 216 is part of the user plane and the AMF 210, SMF 214, PCF 212, AUSF 206, and UDM 208 are part of the control plane. One or more UPFs can connect with one or more data networks (DNs) 220. The UPF 216 can be deployed separately from control plane functions. The NFs of the control plane are modularized such that they can be scaled independently. As shown, each NF service exposes its functionality in a Service Based Architecture (SBA) through a Service Based Interface (SBI) 221 that uses HTTP/2. The SBA can include a Network Exposure Function (NEF) 222, an NF Repository Function (NRF) 224, a Network Slice Selection Function (NSSF) 226, and other functions such as a Service Communication Proxy (SCP).

The SBA can provide a complete service mesh with service discovery, load balancing, encryption, authentication, and authorization for interservice communications. The SBA employs a centralized discovery framework that leverages the NRF 224, which maintains a record of available NF instances and supported services. The NRF 224 allows other NF instances to subscribe and be notified of registrations from NF instances of a given type. The NRF 224 supports service discovery by receipt of discovery requests from NF instances and, in response, details which NF instances support specific services.

The NSSF 226 enables network slicing, which is a capability of 5G to bring a high degree of deployment flexibility and efficient resource utilization when deploying diverse network services and applications. A logical end-to-end (E2E) network slice has predetermined capabilities, traffic characteristics, and service-level agreements and includes the virtualized resources required to service the needs of a Mobile Virtual Network Operator (MVNO) or group of subscribers, including a dedicated UPF, SMF, and PCF. The wireless device 202 is associated with one or more network slices, which all use the same AMF. A Single Network Slice Selection Assistance Information (S-NSSAI) function operates to identify a network slice. Slice selection is triggered by the AMF, which receives a wireless device registration request. In response, the AMF retrieves permitted network slices from the UDM 208 and then requests an appropriate network slice of the NSSF 226.

The UDM 208 introduces a User Data Convergence (UDC) that separates a User Data Repository (UDR) for storing and managing subscriber information. As such, the UDM 208 can employ the UDC under 3GPP TS 22.101 to support a layered architecture that separates user data from application logic. The UDM 208 can include a stateful message store to hold information in local memory or can be stateless and store information externally in a database of the UDR. The stored data can include profile data for subscribers and/or other data that can be used for authentication purposes. Given a large number of wireless devices that can connect to a 5G network, the UDM 208 can contain voluminous amounts of data that is accessed for authentication. Thus, the UDM 208 is analogous to a Home Subscriber Server (HSS) and can provide authentication credentials while being employed by the AMF 210 and SMF 214 to retrieve subscriber data and context.

The PCF 212 can connect with one or more Application Functions (AFs) 228. The PCF 212 supports a unified policy framework within the 5G infrastructure for governing network behavior. The PCF 212 accesses the subscription information required to make policy decisions from the UDM 208 and then provides the appropriate policy rules to the control plane functions so that they can enforce them.

The SCP (not shown) provides a highly distributed multi-access edge compute cloud environment and a single point of entry for a cluster of NFs once they have been successfully discovered by the NRF 224. This allows the SCP to become the delegated discovery point in a datacenter, offloading the NRF 224 from distributed service meshes that make up a network operator's infrastructure. Together with the NRF 224, the SCP forms the hierarchical 5G service mesh.

The AMF 210 receives requests and handles connection and mobility management while forwarding session management requirements over the N11 interface to the SMF 214. The AMF 210 determines that the SMF 214 is best suited to handle the connection request by querying the NRF 224. That interface and the N11 interface between the AMF 210 and the SMF 214 assigned by the NRF 224 use the SBI 221. During session establishment or modification, the SMF 214 also interacts with the PCF 212 over the N7 interface and the subscriber profile information stored within the UDM 208. Employing the SBI 221, the PCF 212 provides the foundation of the policy framework that, along with the more typical QoS and charging rules, includes network slice selection, which is regulated by the NSSF 226.

Figure 3:
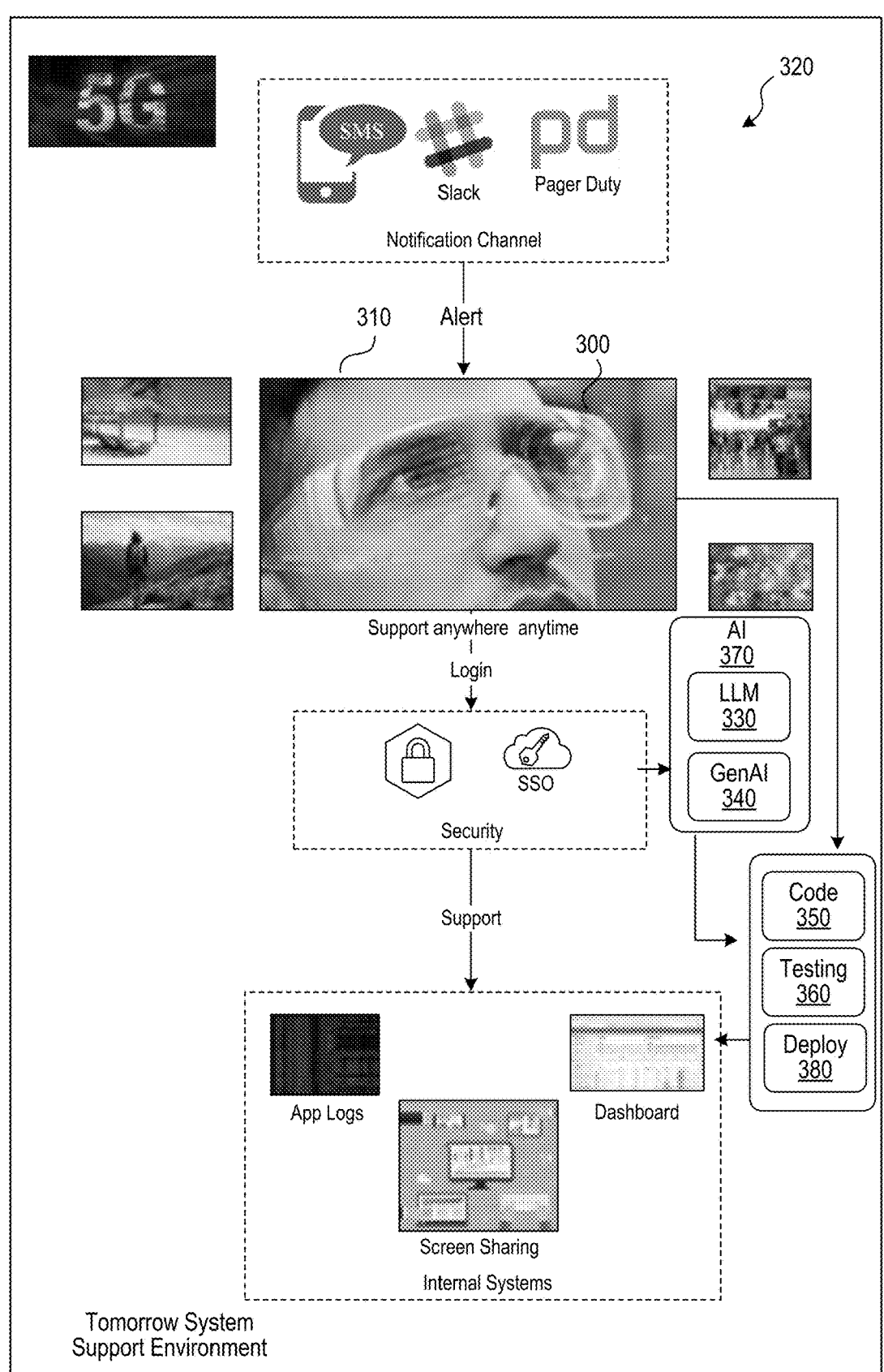
FIG. 3 shows examples of the augmented reality/virtual reality (AR/VR) device that an operator can use to be notified when network issues arise.

Resolving an Issue Associated with a Wireless Telecommunication Network by Suggesting a Solution to the Issue and Receiving an Approval from an AR/VR Device Associated with an Operator of the Network FIG. 3 shows examples of the AR/VR device 300 that an operator 310 can use to be notified when network issues arise. The AR/VR device 300 can be AR glasses. As mentioned above, traditionally, operators must remain physically close to computers with high-speed internet to be able to resolve network issues. Network issues can be issues with the 5G network 100 in FIG. 1 or an earlier generation network, such as a 4G network, a 3G network, a 2G network, etc. The operator 310 can be an AI machine learning (ML) model or a person.

With the 5G wireless telecommunication network 100, operators 310 can obtain high bandwidth even while they are not physically close to a computer with high-speed internet. The high bandwidth enables streaming of video describing issues associated with the network 100 even over cellular data. In addition, the AR/VR device 300 is small and light (smaller and lighter than a laptop) and can be carried on a quick lap run in the early morning or evening, during a trip into a grocery store, on a vacation, etc. Using the 5G network 100, which provides access to the high-speed internet, operators can log onto the company network and have any supported applications available to access.

The system 320 introduces a suite of highly automated tools, eliminating the need for the support operator to be physically present in the office, connected to the office network, or hands-on at the keyboard for extended periods with multiple teams. Now, equipped with AR/VR device 300 running on a high-speed 5G network 100, team members have the flexibility to be located anywhere outside the traditional office environment while efficiently resolving issues in a significantly shorter timeframe. The 5G network 100 provides high bandwidth and low-latency communication, enabling the AR/VR device 300 to receive high-bandwidth communication, such as video, describing the network issue.

By harnessing the power of AI 370 including LLM 330 and GenAI 340 for our internal organizational applications, the system 320 can proactively predict potential issues before they even register with UEs 104 in FIG. 1, operating on the network 100. The system 320, using LLM 330 and GenAI 340, can identify the precise problem and present a resolution, requiring our support SMEs only to be notified and to approve the proposed solution. The LLM 330 can be used for analysis of text and images, while GenAI 340 can be used for generating suggestions. The subsequent cycles of software fixing are seamlessly handled by our automated toolsets including source code generation 350 by GenAI 340, automated testing 360, and deployments 380 upon successful completion of automated testing 360.

The introduction of AR/VR device 300 provides support SMEs with comprehensive visibility into the entire application support life cycle without the need to physically interact with a keyboard. Through voice commands and gestures, agents can delve into presented information, just like watching a recorded movie with the added functionality to pause and progress through different stages effortlessly. This transformative approach not only accelerates issue resolution but also enhances the overall efficiency and accessibility of our support processes.

Figure 4:
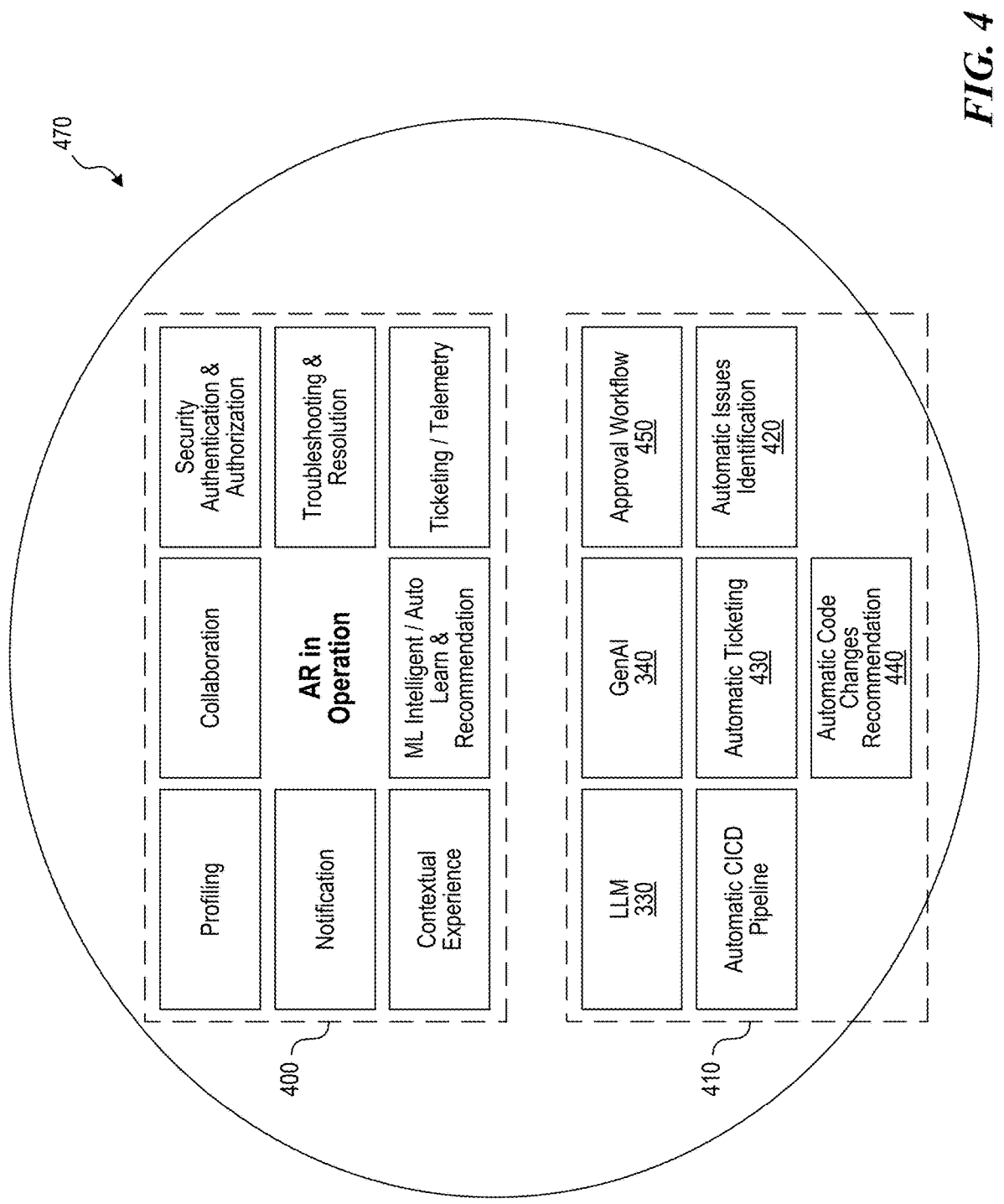
FIG. 4 shows modules and capabilities associated with the disclosed system.

FIG. 4 shows modules and capabilities associated with the disclosed system. The modules 400 are described in U.S. Pat. No. 11,855,831, which is incorporated herein by reference in its entirety.

The modules 410 enable comprehensive end-to-end automation. In particular, automatic issue identification module 420 can automatically identify issues occurring within the network 100 in FIG. 1. The automatic ticketing module 430 can automatically create a ticket describing the issue. The automatic code changes recommendation module 440 can rely on LLM 330 and GenAI 340 to generate code aimed at resolving the issue. The approval workflow module 450 can submit the generated code through testing. If the testing is successful, the approval workflow module 450 can deploy the generated code. If the testing is not successful, the approval workflow module 450 can provide the errors to LLM 330 and GenAI 340, which in turn can generate updated code to be submitted for testing.

For example, LLM 330 and GenAI 340 can monitor traffic through the network 100 in FIG. 1 on a website and can detect that when the UE 104 in FIG. 1 is shopping on the website, the UE terminates the process before placing the order. In addition, the LLM 330 and the GenAI 340 can detect this pattern across multiple UEs 104. The LLM 330 and GenAI 340 can obtain logs associated with the failed orders and can analyze the logs to determine a common pattern across the failed orders.

Upon determining the common pattern, the LLM 330 and GenAI 340 can retrieve related source code and analyze the source code to determine the root cause of the failed orders. For example, the LLM 330 and GenAI 340 can rely on previous issue tickets and issue ticket resolutions, to determine the root cause of failure. Based on the determination of the root cause of failure, the LLM 330 and the GenAI 340 can generate new code or changes to the existing source code.

Then, the system 470 can notify AR/VR device 300 in FIG. 3 of the issue and potential resolution. The notification can include description of the issue, the recommendation, and how the UEs 104 are impacted, and present all of that through the AR/VR device 300. The user of the AR/VR device 300 may be occupied, such as when driving, and may need to interact with the system 470 using voice or hand gestures. The system 470 can ask for approval from the AR/VR device 300 to test the generated code. Upon receiving the approval, the system 470 can test the code and report the results of the test to the AR/VR device 300. Upon receiving the test results, the user of the AR/VR device 300 can approve the code for deployment or can deny deploying the code.

Figure 5:
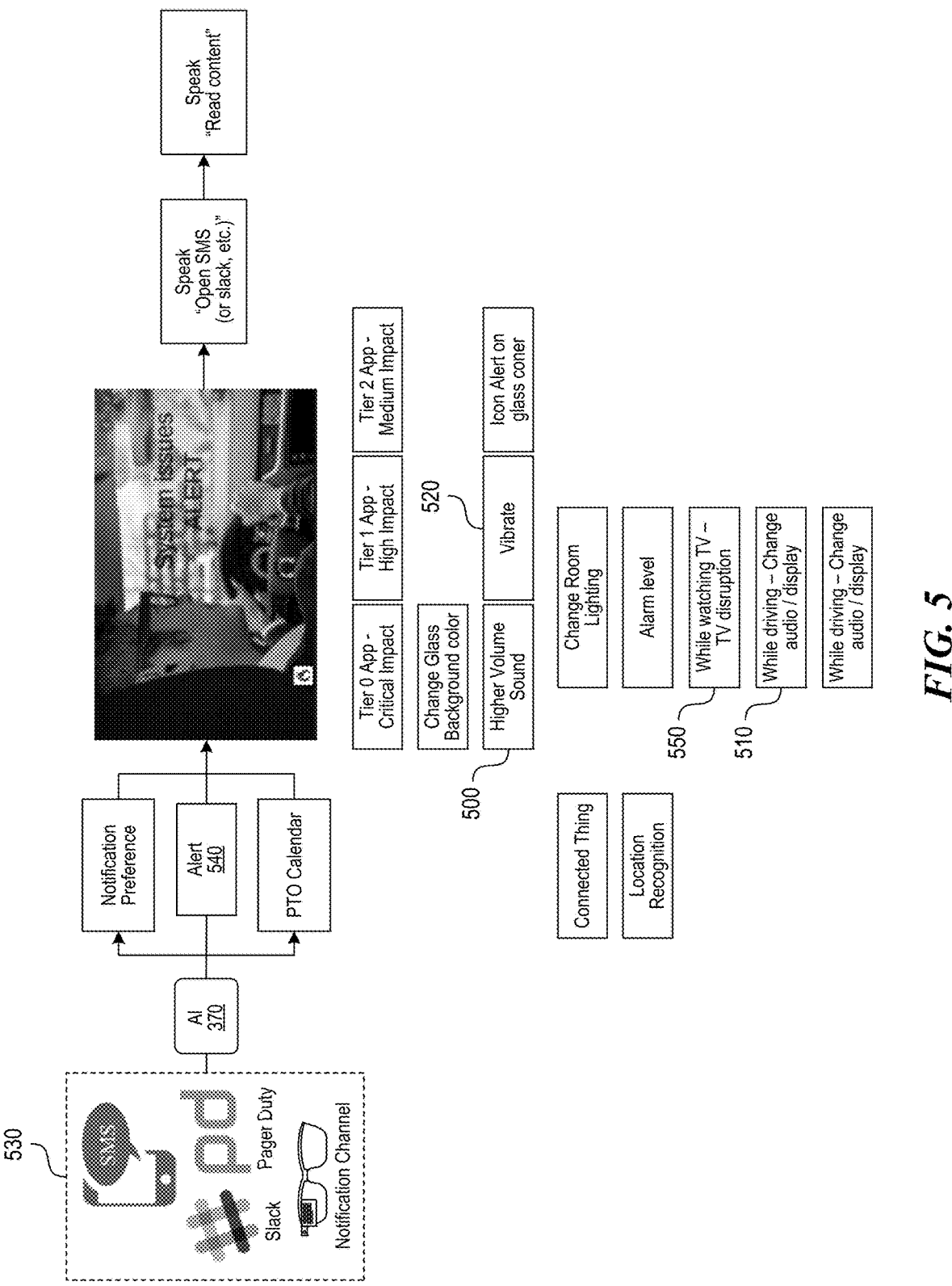
FIG. 5 shows the use case of the technology when the user of the AR/VR device is engaged in another activity.

FIG. 5 shows the use case of the technology when the user of the AR/VR device is engaged in another activity. The AI 370 can obtain information from text messages, chats, or other devices in step 530, analyze the information, and send an alert in notification 540 to the AR/VR device 300 in FIG. 3, even while the user of the AR/VR device is engaged in another activity, such as driving or watching TV. The AR/VR device can assess the devices in the surrounding environment and adjust the notification level accordingly.

For example, when the user is in a car, the AR/VR device 300 can modify the audio volume in step 500, articulate the issues over the car's audio system or the car's display in step 510, vibrate the AR/VR device in step 520, adjust glass color, and more. This ensures the driver's attention is captured in a safe manner, minimizing distractions from hands-on driving activities. Drivers can then concentrate on the road while utilizing voice over IP to navigate through the issues and resolutions effectively. This approach not only enhances safety but also optimizes the support operator's ability to address arising concerns promptly.

In another example, if the user is watching a display device such as a TV, the AR/VR device 300 in step 550 can modify the display device volume or stop the display on the device to deliver the notification 540 over either the AR/VR device 300 or over the display device.

Figure 6:
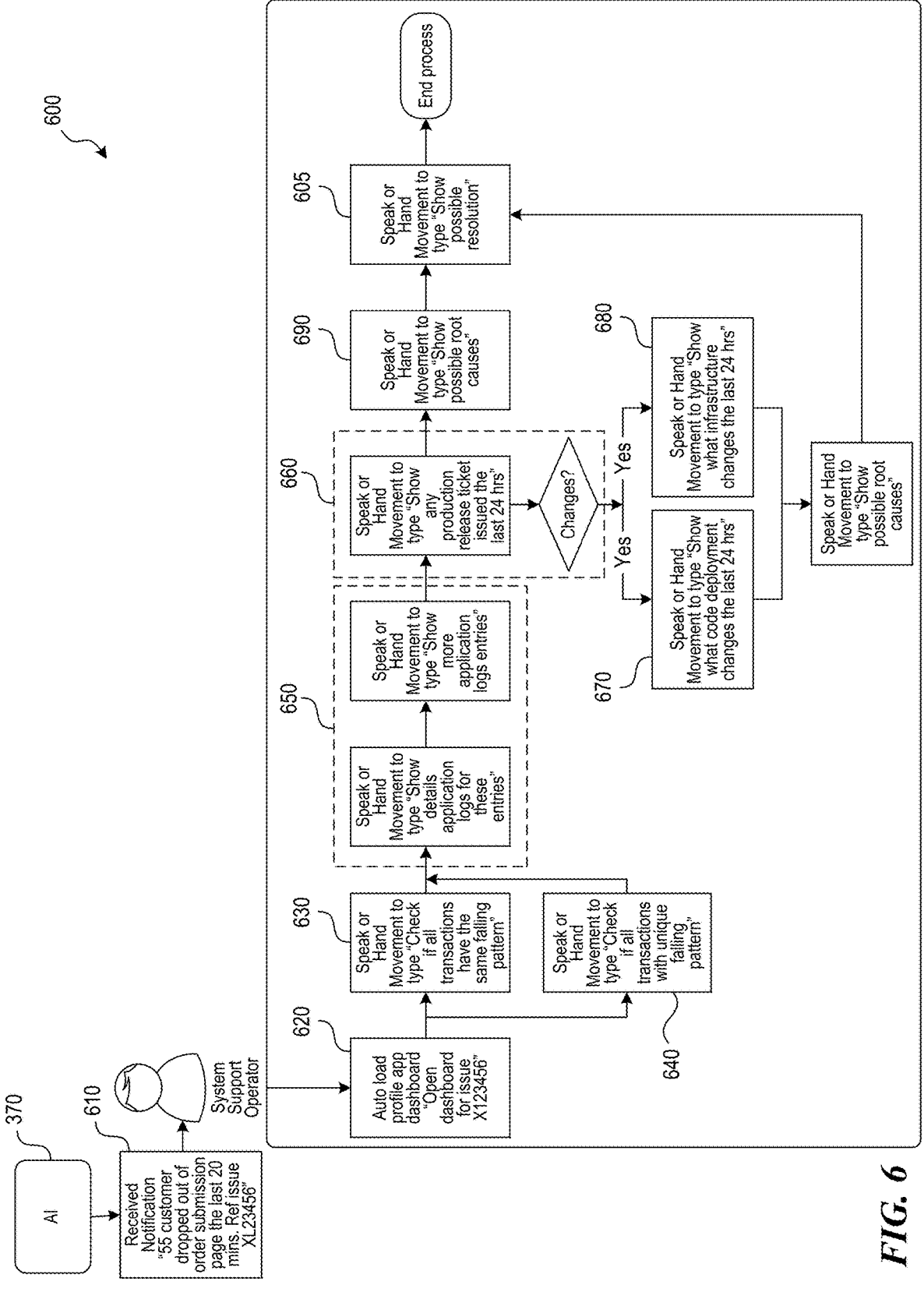
FIG. 6 shows the steps involved in the presentation of an issue and the proposal of a resolution after receiving notifications through the AR/VR device.

FIG. 6 shows the steps involved in the presentation of an issue and the proposal of a resolution after receiving notifications through AR/VR device 300 in FIG. 3. The user can choose to utilize either voice recognition or hand movement technology to navigate through the matter. Given that AI 370 has comprehensively recognized the application behavior, encompassing insights from application and transaction logs, as well as changes resulting from software or hardware releases and fixes, the agent can request any of this information.

AI 370 can present the issue, allowing the agent to validate or delve deeper into the notification. Upon acknowledging the issue, the agent can review the proposed resolution in a similar manner, with the option to inspect the new proposed code changes, facilitated by AI's 370 access to the existing code base.

The steps in the graph 600 represent the steps that the AI 370 can take to determine the root cause and solution to the issue. In addition, these steps can be presented to the AR/VR device 300 if the user is interested to understand the detailed steps taken prior to suggesting the solution.

In step 610, the AI 370 can send a notification of the issue to the AR/VR device 300. The user can interact with the AI using gestures or voice. In step 620, the AI 370 can obtain and present the dashboard describing the issue. In steps 630, 640, the AI 370 can determine whether all processes having the issue also have the same failing pattern, or whether they have unique failing patterns, respectively. In step 650, the AI 370 can obtain logs associated with the failing processes.

In step 660, the AI 370 can determine whether there have been any production releases within a predetermined period of time, such as 24 hours. If there have been production releases within the predetermined period of time, in step 670, 680 the AI 370 can determine whether the production release is software or hardware related, respectively. If there have not been any production releases, the AI 370, in step 690, can determine possible root causes by analyzing the source code associated with the failures, as described in this application. For example, the AI 370 can change the source code in various ways and run the tests using the various source code until one of the source code changes passes the tests. In step 605, the AI 370 can show possible resolutions to the user.

Figure 7:
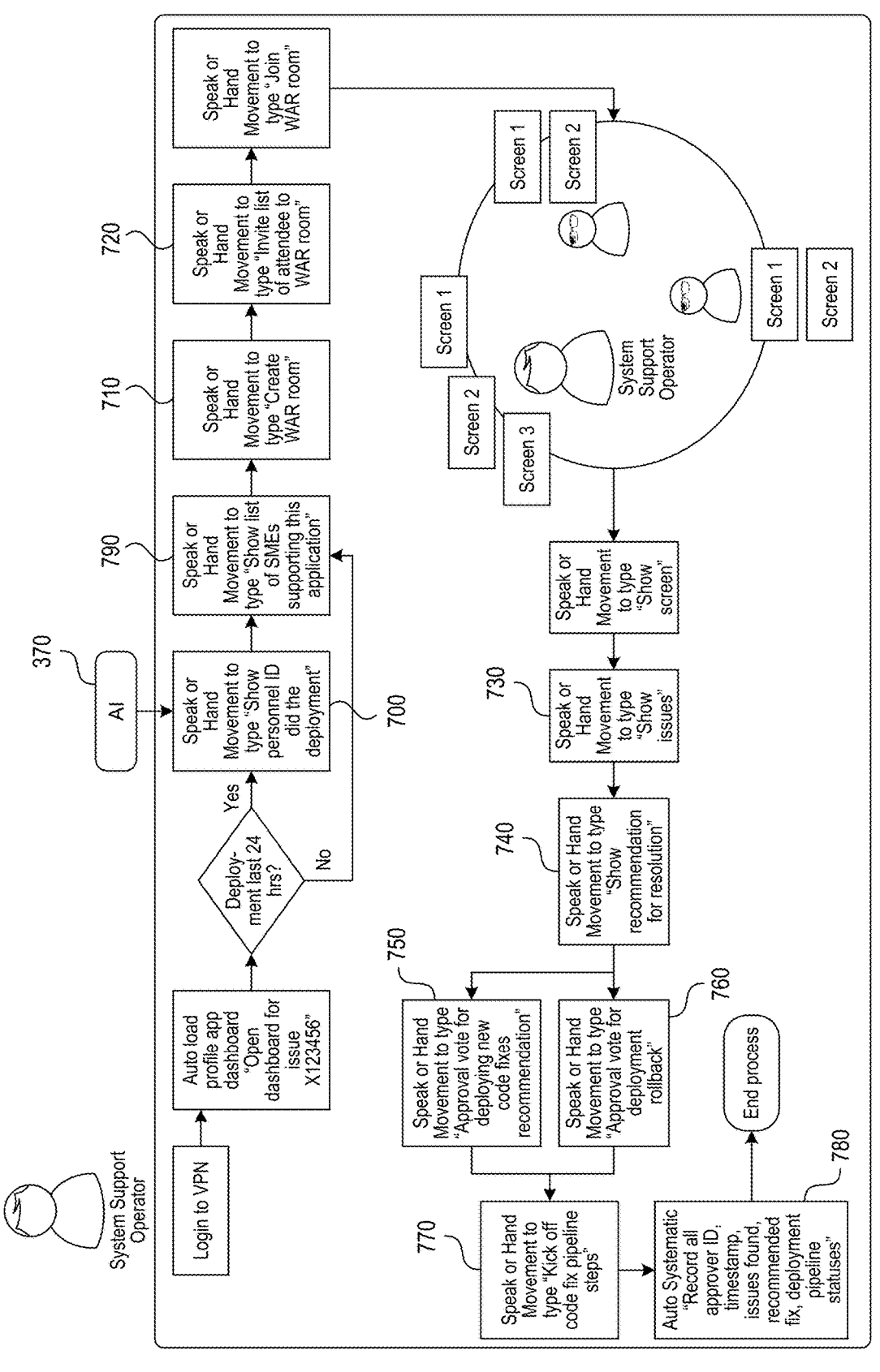
FIG. 7 shows a system to autonomously generate a list of necessary operators involved in issue triage.

FIG. 7 shows a system to autonomously generate a list of necessary operators involved in issue triage. The lead support operator simply needs to review the proposed attendees before extending invitations to the listed operator for collaboration. This eliminates the steps involved in gathering the attendee list and drafting the invitation email content for addressing issues. During the collaboration call, the AR agent can seamlessly navigate through the issues, interacting with other AR or AI agents using conventional voice and hand movement recognition. This streamlined approach enhances the efficiency of issue resolution and collaboration by automating preparatory steps and facilitating intuitive communication during the collaborative process.

The AI 370 can isolate the hardware and/or source code that is associated with the issue and can, in step 700, determine the operator involved with the hardware or the source code. For example, the issue can be associated with a repair work on a cell tower associated with the network 100 in FIG. 1. In that case, the AI 370, in step 700, can determine the operator identifier (ID) involved with the repair work. In another example, the issue can be associated with a source code that has not been changed recently, e.g., within the last 24 hours, however, the AI 370, in step 790, can determine the operator ID that last made a change associated with the problematic source code.

In step 710, the AI 370 can receive an indication to create a virtual collaboration room. In step 720, the AI 370 can invite all the operator IDs associated with the issue. In steps 730, 740, the AI 370 can present the issues and the recommendation for the resolution of the issues, respectively. If the recommended resolution involves deploying new code fixes, in step 750, the AI 370 can prompt the attendees of the virtual collaboration room to vote on the recommended resolution. If the recommended resolution involves rolling back deployed changes in software or hardware, in step 760, the AI 370 can prompt attendees of the virtual collaboration room to vote. In step 770, the AI 370 can deploy the resolution, if the vote approves the deployment. In step 780, regardless of the vote, the AI 370 can record the timestamp of the vote, the operator ID that voted for the recommended fix, the operator ID that voted against the recommended fix, and the recommended fix. If the fix is deployed, the AI 370 can monitor the progress of the fix and record the progress in the log.

Figure 8:
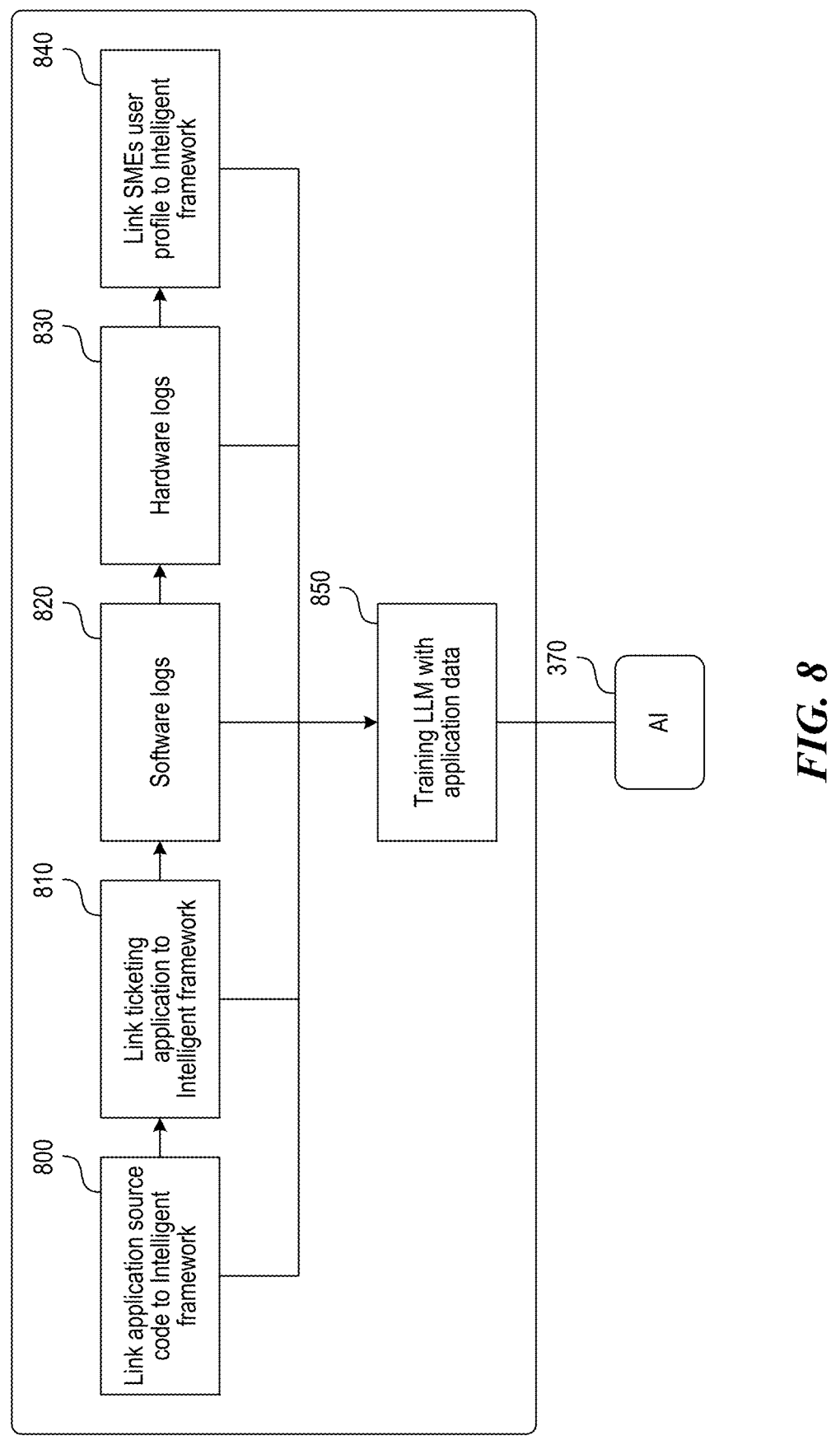
FIG. 8 shows the steps involved in integrating AI into the network.

FIG. 8 shows the steps involved in integrating AI into the network 100 in FIG. 1. To enable AI 370 to discern specific application issues and resolutions, it is imperative to expose AI 370 to all steps and processes within the application environment. AI 370 can be granted access to the application source code, enabling AI 370 to inspect the quality of the deployed code and propose necessary fixes. Granting AI 370 access to the entire application ticket creation process, from deployment requests to completion, allows the AI to recognize the history of application changes in fixes, thus enabling AI 370 to recommend fixes when new issues occur, based on the similarity to the previous fixes.

By reading the ticket content, AI 370 discerns the intent behind application changes and identifies the author, pulling in relevant information when issues arise. AI 370 leverages existing tickets, updating or creating new ones as needed, thereby creating a comprehensive trail of the issue. Furthermore, providing AI 370 access to application logs and transaction data allows it to monitor real-time application behavior. Based on application trends, AI 370 can predict potential issues before they are recognized by humans, contributing to proactive issue resolution. This comprehensive integration ensures that AI 370 is fully embedded into the application ecosystem, enhancing its ability to contribute meaningfully throughout the entire software development life cycle.

The AI 370 can, in step 850, be trained on data including source code 800 associated with the network 100, issue tickets 810 associated with the network 100, software logs 820 associated with the network 100, hardware logs 830 associated with the network, and user profiles 840 associated with the network. The user profiles 840 can list the user's area of expertise, thus helping the AI 370 identify operator IDs to invite to the virtual collaboration room in case an issue arises.

In addition to being trained on the above-described data, the AI 370 can also take as input source code 800, issue tickets 810, software logs 820, hardware logs 830, and/or user profiles 840 to help formulate a resolution to the issue and identify necessary operators to invite to the virtual collaboration room.

Figure 9:
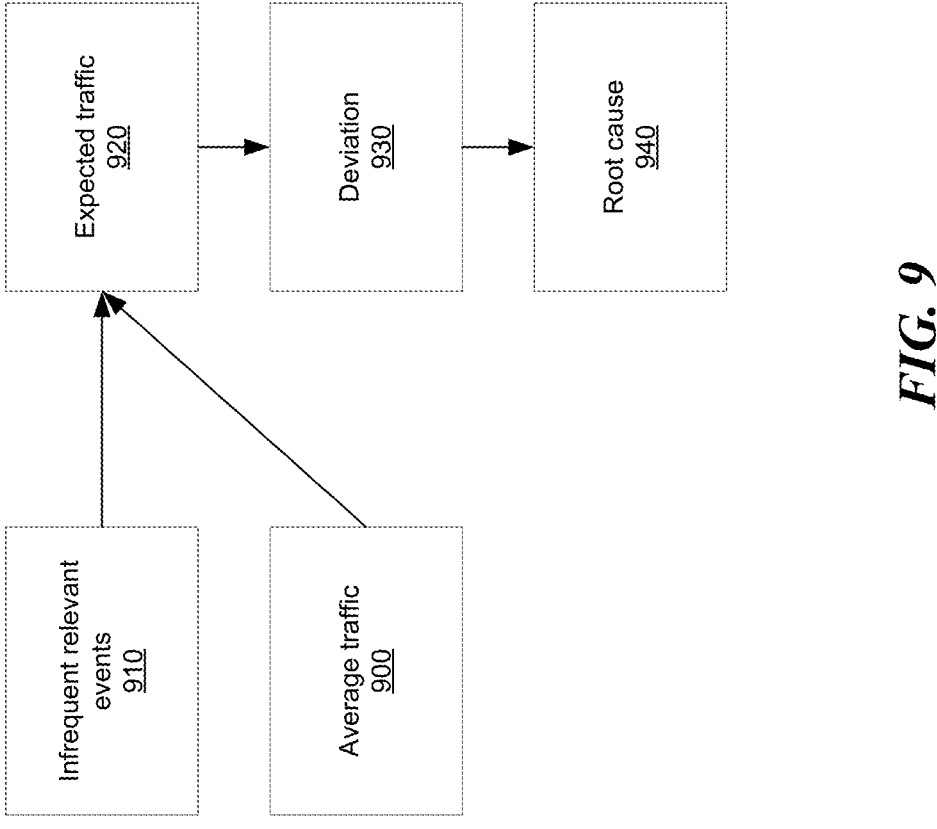
FIG. 9 outlines the steps involved in recognizing potential issues and notifying a support operator in a timely manner to prevent impacts on network.

FIG. 9 outlines the steps involved in recognizing potential issues and notifying the support operator in a timely manner to prevent impacts on network 100 in FIG. 1. As explained in FIG. 6, by granting AI 370 in FIG. 3 access to data as explained in FIG. 8, the AI can monitor the network 100 in FIG. 1, thus reducing the need for human intervention. This automated agent detects any anomaly associated with the network 100, such as a sudden drop or peak in traffic, or compares expected traffic to measured traffic.

To determine expected traffic 920, the AI 370 can obtain an average traffic 900 associated with the website, such as average traffic over a predetermined period of time, such as last day, 7 days, or a month. In addition, the AI 370 can obtain indications of any infrequent relevant events 910 such as holidays or sporting events, e.g., a football game nearby. If there are infrequent relevant events 910 occurring, the AI 370 can modify the expected traffic based on the event. For example, if there is a football game nearby, the AI 370 can obtain information about expected traffic for football games. If it is a holiday, the AI 370 can obtain expected traffic 920 during holiday periods.

The AI 370 can determine a significant change in the traffic, such as a deviation 930 from the expected traffic 920 by more than 10%. For example, the expected traffic 920 can be 100 users per hour for a particular website, but the measured traffic can be 5 users per hour. If there is a significant change in the traffic, the AI 370 can determine the root cause 940 of the deviation. For example, the AI 370 can obtain information about any new hardware or software deployments. If there are no new hardware or software deployments, the AI 370 can examine the existing code related to the issue, such as the existing code related to the website. If the AI 370 cannot find any potential errors with the existing code related to the issue, the AI 370 can determine that there is a hacking attempt. Overall, the AI 370 can enable proactive intervention before these issues have a broader impact on the network 100.

Figure 10:
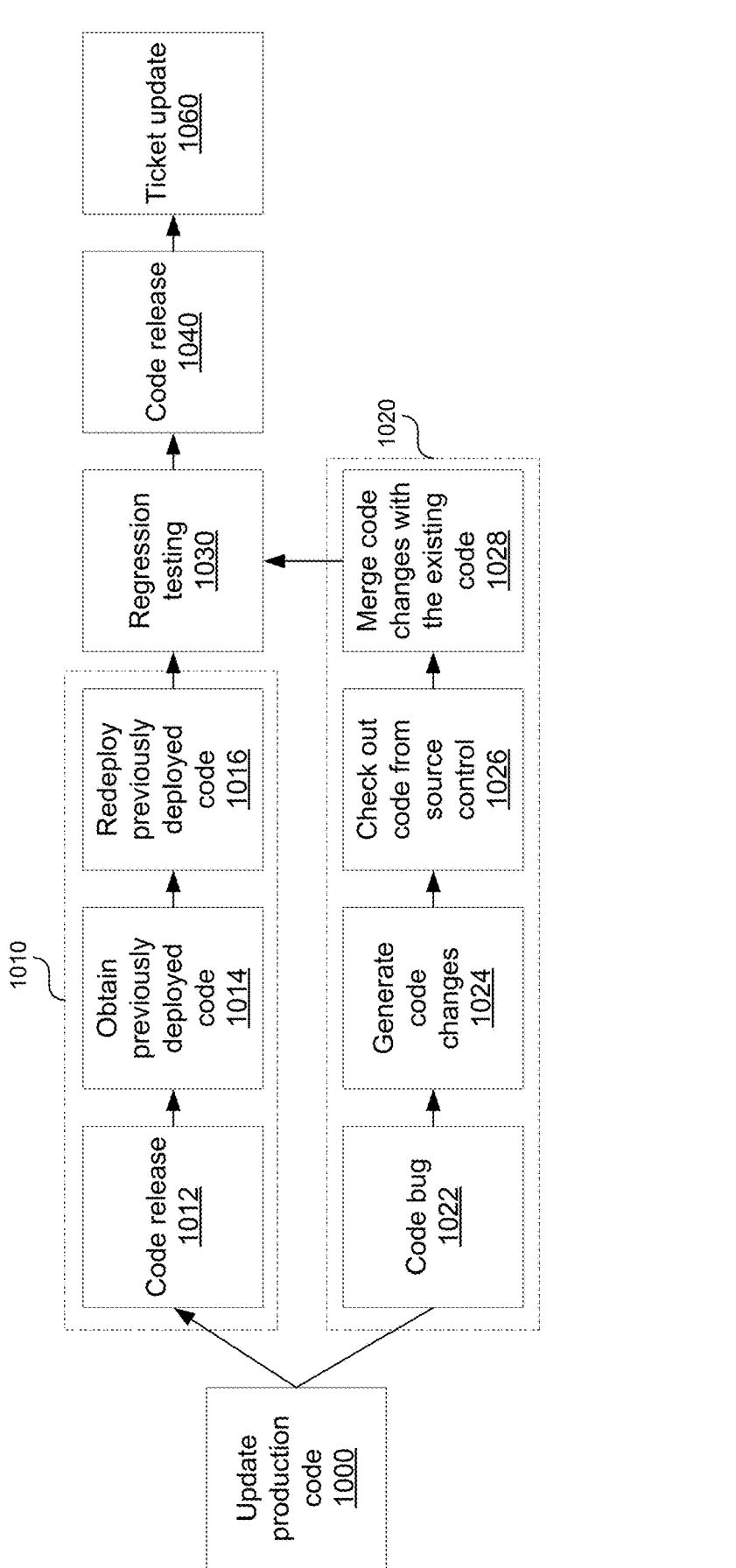
FIG. 10 shows the automation of issue resolution.

FIG. 10 shows the automation of issue resolution. Typically, when the network 100 in FIG. 1 needs a code change for issue resolution, the process involves a manual software deployment pipeline, extensive testing cycles, and application deployment. This traditional workflow consumes a significant amount of time before the resolution goes live.

AI 370 substantially shortens the code change by automating all these steps. Human agents can oversee the outcomes of each step and provide critical approvals using voice or hand movement recognition, reducing the time required for changes to fix the issue from hours to mere minutes. With the entire process automated, the issue ticketing workflow seamlessly aligns with the controlled steps.

Application support operators gain access to a comprehensive overview of everything accomplished in the system, from issue identification to resolution, eliminating the need for extensive manual intervention. This streamlined approach accelerates the issue resolution process and enhances overall efficiency in managing software changes.

In step 1000, the AI 370 can determine that the production code needs to be updated. Steps 1010 show a sequence for rolling back production code, while steps 1020 show a sequence for updating existing code.

In step 1012, the AI 370 can determine that the issue is caused by a code release within the predetermined time, such as within the last 24 hours. In step 1014, the AI 370 can get the previously deployed code prior to the problematic code release, e.g., the prior version of the code. In step 1016, the AI 370 can re-deploy the previously deployed code. In other words, the AI 370, in step 1016, can roll back the most recent release of the code. In step 1030, AI 370 can perform automated regression testing. If the automated regression testing is successful, in step 1040, the AI can release the code to production, and in step 1060, the AI can update the ticket with the issue resolution. If the automated regression testing is not successful, the AI 370 can analyze the error messages from regression testing to further modify the code.

In step 1022, the AI can determine that the issue is caused by a bug in the existing code. In step 1024, the AI 370 can generate the code changes to address the issue. In step 1026, the AI can check out existing code from source control. In step 1028, the AI 370 can merge code changes into the existing code. In step 1030, the AI 370 can perform automated regression testing and followed the other steps as described above.

Figure 11A:
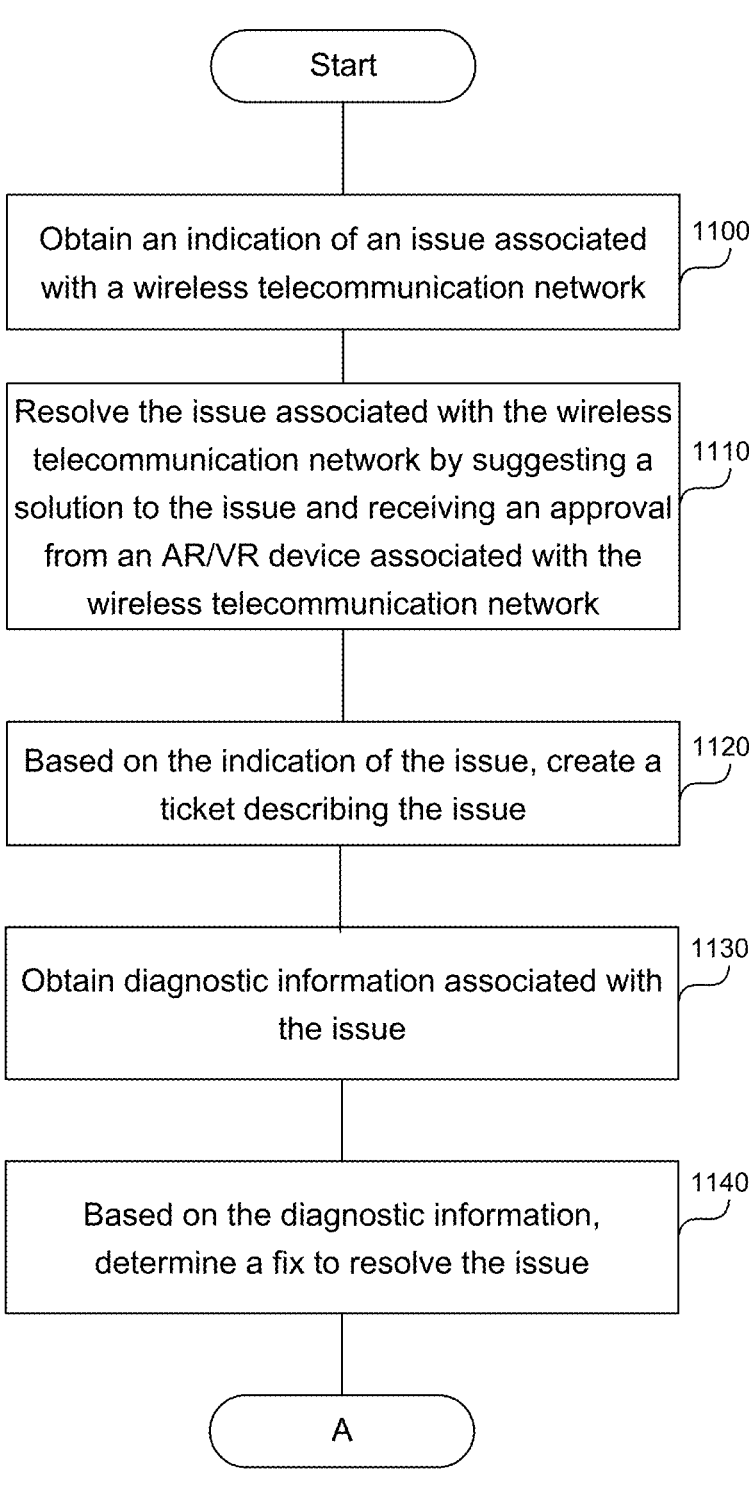

FIGS. 11A-11B show a flowchart of a method to resolve an issue associated with the network 100 in FIG. 1 by suggesting the solution to the issue and receiving an approval from an AR/VR device associated with an operator of the network. The operator of the network can be a person or can be an AI. In step 1100, hardware or software processor associated with the network 100 can obtain an indication of an issue associated with the network 100.

In step 1110, the processor can resolve the issue associated with the network 100 by automatically providing suggestions and receiving an approval from the AR/VR device associated with the network 100.

To obtain the approval, in step 1120, the processor can, based on the indication of the issue, create a ticket describing the issue associated with the network 100. In step 1130, the processor can obtain diagnostic information associated with the issue. The diagnostic information can include an application log associated with the issue, a code associated with the issue, and a device log associated with the issue. In step 1140, based on the diagnostic information, the processor can determine a fix to resolve the issue. The fix can be a change to the code, or a change to a device associated with the network 100, such as a change to the cell tower configuration, change to an antenna orientation, change to sector parameters, etc.

In step 1150, to obtain the approval, the processor can send a first notification to an AR/VR device associated with the operator of the network 100. The first notification can include a description associated with the issue, the fix to resolve the issue, and a request for an approval to test the fix.

In step 1160, upon receiving the approval to test the fix, the processor can perform regression testing using the fix. In step 1170, the processor can determine whether the fix passed the regression testing. Upon determining that the fix did not pass the regression testing, the processor can provide the errors from the regression testing as a diagnostic information and repeat the steps 1140-1160. In step 1180, upon determining that the fix passed the regression testing, the processor can send a second notification to the AR/VR device requesting an approval to deploy the fix to the network 100. In step 1190, upon receiving the approval to deploy the fix to the network 100, the processor can deploy the fix.

Upon not receiving the approval to test the fix or not receiving the approval to deploy the fix, the processor can send a first request to the AR/VR device to modify the fix. In other words, the processor can invite the operator of the AR/VR device to change the fix or propose a different fix.

In one embodiment, to obtain the diagnostic information associated with the issue, the processor can obtain an indication of a most recent code change associated with the network 100. The processor can create a test code removing the most recent code change. The processor can run the test code in a test environment to determine whether the issue associated with the network 100 persists. Upon determining that the issue associated with the network 100 is resolved, the processor can determine the test code to be the fix to resolve the issue. Upon determining that the issue associated with the network 100 is not resolved, the processor can modify the most recent code to obtain the change to the code to resolve the issue. For example, the processor can change the source code in various ways and run the multiple tests using the various source code changes, until one of the source code changes passes the tests.

In another embodiment, to obtain diagnostic information associated with the issue, the processor can detect anomalies. The processor can obtain expected traffic associated with a portion of the network 100 and actual traffic associated with the portion of the network 100. The portion of the network 100 can be a website, cell tower, an antenna, sector, etc. The processor can determine whether the actual traffic differs from the expected traffic above a predetermined threshold, such as 10%. Upon determining that the actual traffic differs from the expected traffic above the predetermined threshold, by being more than 10% above or below the expected traffic, the processor can obtain the diagnostic information associated with the portion of the network 100.

The processor can obtain training data including an application log associated with the network 100, a code associated with the network 100, a device log associated with the network 100, an issue ticket associated with the network 100, and a resolution of the issue ticket associated with the network 100. The processor can train an AI, e.g., AI 370 in FIG. 3, using the training data. The processor can use AI to determine the fix to resolve the issue based on the diagnostic information.

The processor can determine whether the AR/VR device is associated with a vehicle by, for example, obtaining the speed of movement associated with the AR/VR device, and determining that the speed of movement is above a predetermined threshold, such as 6 miles per hour. Upon determining that the AR/VR devices is associated with the vehicle, the processor can cause the AR/VR device to articulate the first notification using an audio system associated with the vehicle.

The processor can determine the operators relevant to the resolution of the issue, create a virtual collaboration room, and invite the relevant operators to join. Specifically, the processor can obtain multiple operator IDs associated with the diagnostic information. The processor can send the first notification to multiple AR/VR devices associated with the multiple operator IDs. The processor can request the multiple AR/VR devices to place multiple votes regarding the request for the approval to test the fix. Based on the multiple votes, the processor can determine whether the approval to test the fix is received, by, for example, determining if the majority of the multiple operators voted for the approval.

Computer System

Figure 12:
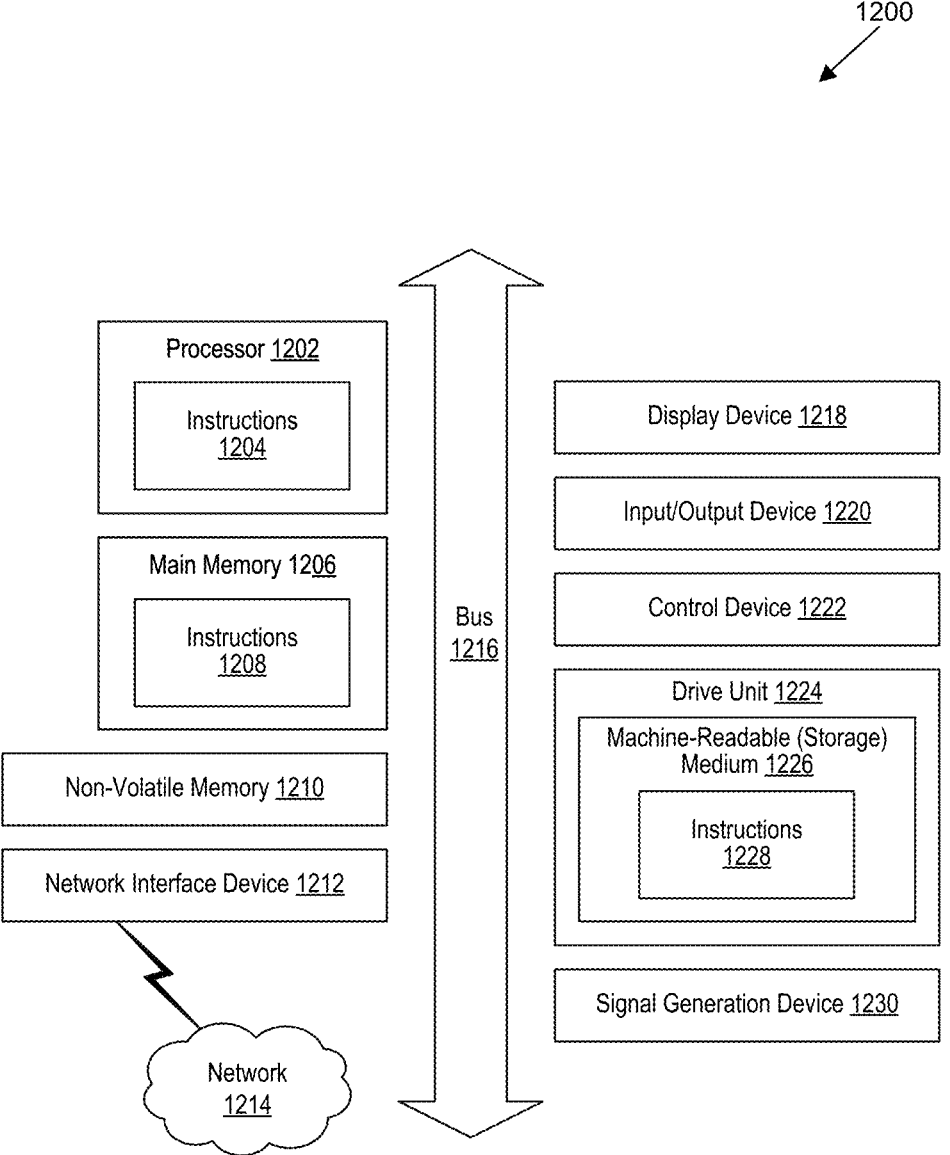
FIG. 12 is a block diagram that illustrates an example of a computer system in which at least some operations described herein can be implemented.

FIG. 12 is a block diagram that illustrates an example of a computer system 1200 in which at least some operations described herein can be implemented. As shown, the computer system 1200 can include: one or more processors 1202, main memory 1206, non-volatile memory 1210, a network interface device 1212, a video display device 1218, an input/output device 1220, a control device 1222 (e.g., keyboard and pointing device), a drive unit 1224 that includes a machine-readable (storage) medium 1226, and a signal generation device 1230, which are communicatively connected to a bus 1216. The bus 1216 represents one or more physical buses and/or point-to-point connections that are connected by appropriate bridges, adapters, or controllers. Various common components (e.g., cache memory) are omitted from FIG. 12 for brevity. Instead, the computer system 1200 is intended to illustrate a hardware device on which components illustrated or described relative to the examples of the Figures and any other components described in this specification can be implemented.

The computer system 1200 can take any suitable physical form. For example, the computing system 1200 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 1200. In some implementations, the computer system 1200 can be an embedded computer system, a system-on-chip (SOC), a single-board computer system (SBC), or a distributed system such as a mesh of computer systems, or it can include one or more cloud components in one or more networks. Where appropriate, one or more computer systems 1200 can perform operations in real time, in near real time, or in batch mode.

The network interface device 1212 enables the computing system 1200 to mediate data in a network 1214 with an entity that is external to the computing system 1200 through any communication protocol supported by the computing system 1200 and the external entity. Examples of the network interface device 1212 include a network adapter card, a wireless network interface card, a router, an access point, a wireless router, a switch, a multilayer switch, a protocol converter, a gateway, a bridge, a bridge router, a hub, a digital media receiver, and/or a repeater, as well as all wireless elements noted herein.

The memory (e.g., main memory 1206, non-volatile memory 1210, machine-readable medium 1226) can be local, remote, or distributed. Although shown as a single medium, the machine-readable medium 1226 can include multiple media (e.g., a centralized/distributed database and/ or associated caches and servers) that store one or more sets of instructions 1228. The machine-readable medium 1226 can include any medium that is capable of storing, encoding, or carrying a set of instructions for execution by the computing system 1200. The machine-readable medium 1226 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory 1210, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 1204, 1208, 1228) set at various times in various memory and storage devices in computing device(s). When read and executed by the processor 1202, the instruction(s) cause the computing system 1200 to perform operations to execute elements involving the various aspects of the disclosure.

REMARKS

The terms "example," "embodiment," and "implementation" are used interchangeably. For example, references to "one example" or "an example" in the disclosure can be, but not necessarily are, references to the same implementation; and such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described that can be exhibited by some examples and not by others. Similarly, various requirements are described that can be requirements for some examples but not for other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense—that is to say, in the sense of "including, but not limited to." As used herein, the terms "connected," "coupled," and any variants thereof mean any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number, respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a means-plus-function claim will use the words "means for." However, the use of the term "for" in any other context is not intended to invoke a similar interpretation. The applicant reserves the right to pursue such additional claim forms either in this application or in a continuing application.

I claim:

1. A non-transitory, computer-readable storage medium comprising instructions recorded thereon, wherein the instructions, when executed by at least one data processor of a system, cause the system to:

obtain an indication of an issue associated with a 5G wireless telecommunication network;

resolve the issue associated with the 5G wireless telecommunication network by automatically suggesting a solution to the issue and receiving an approval from an augmented reality/virtual reality (AR/VR) device associated with an operator of the 5G wireless telecommunication network by:

based on the indication of the issue, creating a ticket describing the issue associated with the 5G wireless telecommunication network;

obtaining diagnostic information associated with the issue, wherein the diagnostic information includes an application log associated with the issue, a code associated with the issue, and a device log associated with the issue;

based on the diagnostic information, determining a change to the code to resolve the issue;

sending a first notification to the AR/VR device associated with an operator of the 5G wireless telecommunication network, wherein the first notification includes a description associated with the issue, the change to the code to resolve the issue, and a request for an approval to test the change to the code;

upon receiving the approval to test the change to the code, performing regression testing using the change to the code;

determining whether the change to the code passed the regression testing;

upon determining that the change to the code passed the regression testing, sending a second notification to the AR/VR device requesting an approval to deploy the change to the code to the 5G wireless telecommunication network; and upon receiving the approval to deploy the change to the code to the 5G wireless telecommunication network, deploying the change to the code.

2. The non-transitory, computer-readable storage medium of claim 1, wherein the instructions to obtain the diagnostic information associated with the issue comprise instructions to:

obtain an indication of a most recent code change associated with the 5G wireless telecommunication network;

create a test code removing the most recent code change;

run the test code in a test environment to determine whether the issue associated with the 5G wireless telecommunication network still persists;

upon determining that the issue associated with the 5G wireless telecommunication network is resolved, determine the test code to be the change to the code to resolve the issue; and upon determining that the issue associated with the 5G wireless telecommunication network is not resolved, modify the most recent code to obtain the change the code to resolve the issue.

3. The non-transitory, computer-readable storage medium of claim 1, wherein the instructions to obtain the diagnostic information associated with the issue comprise instructions to:

obtain expected traffic associated with a portion of the 5G wireless telecommunication network and actual traffic associated with the portion of the 5G wireless telecommunication network;

determine whether the actual traffic differs from the expected traffic above a predetermined threshold; and upon determining that the actual traffic differs from the expected traffic above the predetermined threshold, obtain the diagnostic information associated with the portion of the 5G wireless telecommunication network.

4. The non-transitory, computer-readable storage medium of claim 1, comprising instructions to:

obtain training data including an application log associated with the 5G wireless telecommunication network, a code associated with the 5G wireless telecommunication network, a device log associated with the 5G wireless telecommunication network, an issue ticket associated with the 5G wireless telecommunication network, and a resolution of the issue ticket associated with the 5G wireless telecommunication network;

train an artificial intelligence using the training data; and use the artificial intelligence to determine the change to the code to resolve the issue based on the diagnostic information.

5. The non-transitory, computer-readable storage medium of claim 1, comprising instructions to:

determine whether the AR/VR device is associated with a vehicle; and upon determining that the AR/VR device is associated with the vehicle, cause the AR/VR device to articulate the first notification using an audio system associated with the vehicle.

6. The non-transitory, computer-readable storage medium of claim 1, comprising instructions to:

obtain multiple operator IDs associated with the diagnostic information;

send the first notification to multiple AR/VR devices associated with the multiple operator IDs;

request the multiple AR/VR devices to place multiple votes regarding the request for the approval to test the change to the code; and based on the multiple votes, determine whether the approval to test the change to the code is received.

7. The non-transitory, computer-readable storage medium of claim 1, comprising instructions to:

upon not receiving the approval to test the change to the code or not receiving the approval to deploy the change to the code, send a first request to the AR/VR device to modify the change to the code.

8. A method comprising:

obtaining an indication of an issue associated with a wireless telecommunication network; and resolving the issue associated with the wireless telecommunication network by suggesting a solution and receiving an approval from an AR/VR device associated with an operator of the wireless telecommunication network by:

based on the indication of the issue, creating a ticket describing the issue associated with the wireless telecommunication network;

obtaining diagnostic information associated with the issue;

based on the diagnostic information, determining a fix to resolve the issue;

sending a first notification to an augmented reality/virtual reality (AR/VR) device associated with the operator of the wireless telecommunication network, wherein the first notification includes a description associated with the issue, the fix to resolve the issue, and a request for an approval to test the fix;

upon receiving the approval to test the fix, performing testing using the fix;

determining whether the fix passed the testing;

upon determining that the fix passed the testing, sending a second notification to the AR/VR device requesting an approval to deploy the fix to the wireless telecommunication network; and upon receiving the approval to deploy the fix to the wireless telecommunication network, deploying the fix.

9. The method of claim 8, wherein obtaining the diagnostic information associated with the issue comprises:

obtaining an indication of a most recent code change associated with the wireless telecommunication network;

creating a test code removing the most recent code change;

running the test code in a test environment to determine whether the issue associated with the wireless telecommunication network still persists;

upon determining that the issue associated with the wireless telecommunication network is resolved, determining the test code to be the fix to resolve the issue; and upon determining that the issue associated with the wireless telecommunication network is not resolved, modifying the most recent code to obtain the change to the code to resolve the issue.

10. The method of claim 8, wherein obtaining the diagnostic information associated with the issue comprises:

obtaining expected traffic associated with a portion of the wireless telecommunication network and actual traffic associated with the portion of the wireless telecommunication network;

determining whether the actual traffic differs from the expected traffic above a predetermined threshold; and upon determining that the actual traffic differs from the expected traffic above the predetermined threshold, obtaining the diagnostic information associated with the portion of the wireless telecommunication network.

11. The method of claim 8, comprising:

obtaining training data including an application log associated with the wireless telecommunication network, a code associated with the wireless telecommunication network, a device log associated with the wireless telecommunication network, an issue ticket associated with the wireless telecommunication network, and a resolution of the issue ticket associated with the wireless telecommunication network;

training an artificial intelligence using the training data; and using the artificial intelligence to determine the fix to resolve the issue based on the diagnostic information.

12. The method of claim 8, comprising:

determining whether the AR/VR device is associated with a vehicle; and upon determining that the AR/VR devices is associated with the vehicle, causing the AR/VR device to articulate the first notification using an audio system associated with the vehicle.

13. The method of claim 8, comprising:

obtaining multiple operator IDs associated with the diagnostic information;

sending the first notification to multiple AR/VR devices associated with the multiple operator IDs;

requesting the multiple AR/VR devices to place multiple votes regarding the request for the approval to test the fix; and based on the multiple votes, determining whether the approval to test the fix is received.

14. A system comprising:

at least one hardware processor; and at least one non-transitory memory storing instructions, which, when executed by the at least one hardware processor, cause the system to:

obtain an indication of an issue associated with a wireless telecommunication network; and resolve the issue associated with the wireless telecommunication network by suggesting a solution and receiving an approval from an AR/VR device associated with an operator of the wireless telecommunication network by:

based on the indication of the issue, creating a ticket describing the issue associated with the wireless telecommunication network;

obtaining diagnostic information associated with the issue;

based on the diagnostic information, determining a fix to resolve the issue;

sending a first notification to an augmented reality/virtual reality (AR/VR) device associated with the operator of the wireless telecommunication network, wherein the first notification includes a description associated with the issue, the fix to resolve the issue, and a request for an approval to test the fix;

upon receiving the approval to test the fix, performing testing using the fix;

determining whether the fix passed the testing;

upon determining that the fix passed the testing, sending a second notification to the AR/VR device requesting an approval to deploy the fix to the wireless telecommunication network; and upon receiving the approval to deploy the fix to the wireless telecommunication network, deploying the fix.

15. The system of claim 14, wherein the instructions to obtain the diagnostic information associated with the issue comprise instructions to:

obtain an indication of a most recent code change associated with the wireless telecommunication network;

create a test code removing the most recent code change;

run the test code in a test environment to determine whether the issue associated with the wireless telecommunication network still persists;

upon determining that the issue associated with the wireless telecommunication network is resolved, determine the test code to be the fix to resolve the issue; and upon determining that the issue associated with the wireless telecommunication network is not resolved, modify the most recent code to obtain the change to the code to resolve the issue.

16. The system of claim 14, wherein the instructions to obtain the diagnostic information associated with the issue comprise instructions to:

obtain expected traffic associated with a portion of the wireless telecommunication network and actual traffic associated with the portion of the wireless telecommunication network;

determine whether the actual traffic differs from the expected traffic above a predetermined threshold; and upon determining that the actual traffic differs from the expected traffic above the predetermined threshold, obtain the diagnostic information associated with the portion of the wireless telecommunication network.

17. The system of claim 14, comprising instructions to:

obtain training data including an application log associated with the wireless telecommunication network, a code associated with the wireless telecommunication network, a device log associated with the wireless telecommunication network, an issue ticket associated with the wireless telecommunication network, and a resolution of the issue ticket associated with the wireless telecommunication network;

train an artificial intelligence using the training data; and use the artificial intelligence to determine the fix to resolve the issue based on the diagnostic information.

18. The system of claim 14, comprising instructions to:

determine whether the AR/VR device is associated with a vehicle; and upon determining that the AR/VR devices is associated with the vehicle, cause the AR/VR device to articulate the first notification using an audio system associated with the vehicle.

19. The system of claim 14, comprising instructions to:

obtain multiple operator IDs associated with the diagnostic information;

send the first notification to multiple AR/VR devices associated with the multiple operator IDs;

request the multiple AR/VR devices to place multiple votes regarding the request for the approval to test the fix; and based on the multiple votes, determine whether the approval to test the fix is received.

20. The system of claim 14, comprising instructions to:

upon not receiving the approval to test the fix or not receiving the approval to deploy the fix, send a first request to the AR/VR device to modify the fix.

\* \* \* \* \*